United States Patent
Wang

(10) Patent No.: US 10,608,439 B2
(45) Date of Patent: Mar. 31, 2020

(54) CEILING FAN WITH GESTURE INDUCTION FUNCTION

(71) Applicant: AIR COOL INDUSTRIAL CO., LTD., Taichung (TW)

(72) Inventor: Cliff Wang, Taichung (TW)

(73) Assignee: AIR COOL INDUSTRIAL CO., LTD., Taichung (TW)

( * ) Notice: Subject to any disclaimer, the term of this patent is extended or adjusted under 35 U.S.C. 154(b) by 225 days.

(21) Appl. No.: 15/875,882

(22) Filed: Jan. 19, 2018

(65) Prior Publication Data
US 2019/0229536 A1    Jul. 25, 2019

(51) Int. Cl.
| | |
|---|---|
| H02J 4/00 | (2006.01) |
| F04D 25/08 | (2006.01) |
| F04D 27/00 | (2006.01) |
| H04B 10/50 | (2013.01) |
| H02P 31/00 | (2006.01) |
| H05B 47/19 | (2020.01) |

(52) U.S. Cl.
CPC .............. *H02J 4/00* (2013.01); *F04D 25/088* (2013.01); *F04D 27/004* (2013.01); *F04D 27/008* (2013.01); *H02P 31/00* (2013.01); *H04B 10/50* (2013.01); *H05B 47/19* (2020.01)

(58) Field of Classification Search
CPC .......... G08C 2201/32; H02J 4/00; H02J 7/00; F04D 25/00
USPC .......................................................... 307/11
See application file for complete search history.

(56) References Cited

U.S. PATENT DOCUMENTS

| | | | | |
|---|---|---|---|---|
| 2011/0181510 A1* | 7/2011 | Hakala | ..................... | G06F 3/017 345/158 |
| 2014/0049417 A1* | 2/2014 | Abdurrahman | ........ | G08C 19/00 341/176 |
| 2014/0184499 A1* | 7/2014 | Kim | ........................ | G08C 23/04 345/156 |
| 2014/0225824 A1* | 8/2014 | Shpunt | ................... | G06F 3/0488 345/156 |
| 2015/0309164 A1* | 10/2015 | Cho | ........................ | G01S 7/493 250/216 |
| 2015/0325112 A1* | 11/2015 | McPherson | ....... | H04W 72/0453 455/419 |
| 2016/0047391 A1* | 2/2016 | McPherson | ......... | F04D 25/0693 417/423.7 |
| 2016/0180701 A1* | 6/2016 | Golliher | .................. | G06F 3/017 340/12.5 |

(Continued)

*Primary Examiner* — Rexford N Barnie
*Assistant Examiner* — Joseph N Inge
(74) *Attorney, Agent, or Firm* — Sinorica, LLC

(57) ABSTRACT

A ceiling fan with gesture induction function includes a switch box provided beneath a motor housing and a blade unit. The switch box is installed therein with a transmitter, a receiver and a controller. The controller can drive the transmitter to transmit a wireless signal to the receiver and further control at least one electrical apparatus of the ceiling fan through reception of a sampling signal of the receiver. The ceiling fan with gesture induction function of this invention enables a user to control the electrical apparatus of the ceiling fan by employing gesture to obstruct the wireless signal, and is unnecessary to disassemble the motor housing and the blade unit for repair of the facilities in the switch box so the ceiling fan with gesture induction function of this invention is safer and more convenient in maintenance.

11 Claims, 8 Drawing Sheets

(56) References Cited

U.S. PATENT DOCUMENTS

2017/0029107 A1* 2/2017 Emami ................ B64C 39/024
2017/0117891 A1* 4/2017 Lohbihler ............. H05B 45/10

* cited by examiner ental ceiling fan can be operated well, yet, if the motor 2 and the driver 3 need to be repaired, a repairman has to stand on a working ladder and his standing height is close to the ceiling, and the repairman has to disassemble the blade unit 4 and the motor housing 1 before repairing the motor 2 and the driver 3, thus likely to result in danger, difficult in maintenance and not easy to be operated by a single person.

CEILING FAN WITH GESTURE INDUCTION FUNCTION

BACKGROUND OF THE INVENTION

1. Field of the Invention

This invention relates to a ceiling fan, particularly to a ceiling fan with gesture induction function.

2. Description of the Prior Art

A first conventional ceiling fan, as shown in FIG. 1, includes a motor housing 1 installed therein with a motor 2 and a driver 3. The motor 2 is pivotally connected with a blade unit 4, and the ceiling fan is firmly fixed at a ceiling by means of a fixing rod 5 and a fixing seat 6. Thus, the driver 3 can drive the motor 2 to operate and actuate the blade unit 4 to rotate pivotally. Although the first conventional ceiling fan can be operated well, yet, if the motor 2 and the driver 3 need to be repaired, a repairman has to stand on a working ladder and his standing height is close to the ceiling, and the repairman has to disassemble the blade unit 4 and the motor housing 1 before repairing the motor 2 and the driver 3, thus likely to result in danger, difficult in maintenance and not easy to be operated by a single person.

A second conventional ceiling fan, as shown FIG. 2, is to have the fixing seat 6 of the first conventional ceiling fan additionally installed therein with a wireless controller 7, which is electrically connected with the driver 3, so that a user within a certain distance from the ceiling fan can operate a remote controller 8 to transmit wireless signals to the wireless controller 7 for actuating the driver 3 to control the motor 2 to operate, stop operating and adjust rotating speed. Although the second conventional ceiling fan is additionally provided with the remote controller 8 and the wireless controller 7 to enhance convenience in use for the user, yet loss and fault of the remote controller 8 will cause inconvenience to the user. Further, when the wireless controller 7 needs to be repaired, a repairman has to stand on a working ladder to disassemble the fixing seat 6 before repairing the wireless controller 7.

SUMMARY OF THE INVENTION

The objective of this invention is to offer a ceiling fan with gesture induction function, which enables a user to control the electrical apparatus of the ceiling fan, such as a motor and an electric lamp, through gesture induction and which is safer and more convenient in maintenance through improved structure of the ceiling fan.

The ceiling fan with gesture induction function in the present invention includes a main body formed with a motor housing, a blade unit and at least one electrical apparatus. A switch box is secured at the underside of the motor housing and located beneath the blade unit. A transmitter is received in the switch box, able to transmit a reflexible wireless signal. A receiver is received in the switch box and provided at the reflection path of the wireless signal, able to transmit a sampling signal when the receiver receives the wireless signal and is unable to receive the wireless signal. A controller is fixed in the switch box and electrically connected with the at least one electrical apparatus and the transmitter and the receiver, and the controller can drive the transmitter and further control the at least one electrical apparatus through reception of the sampling signal.

During use of the ceiling fan with gesture induction function of this invention, a user can place a barrier, such as a hand, at the reflection path of the wireless signal for obstructing transmission of the wireless signal. When the receiver receives the wireless signal and is unable to receive the wireless signal, the receiver will transmit the sampling signal to the controller for carrying out calculation, memory, judgment and processing and further controlling the at least one electrical apparatus, thus enabling a user to control the electrical apparatus of the ceiling fan through gesture induction. When the facilities in the switch box need to be repaired, a repairman only needs to open the switch box provided beneath the motor housing and the blade unit and need not disassemble the motor housing and thus, the repairman can keep away from the fan blades when working at high place, safer and more convenient in maintenance of the ceiling fan.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
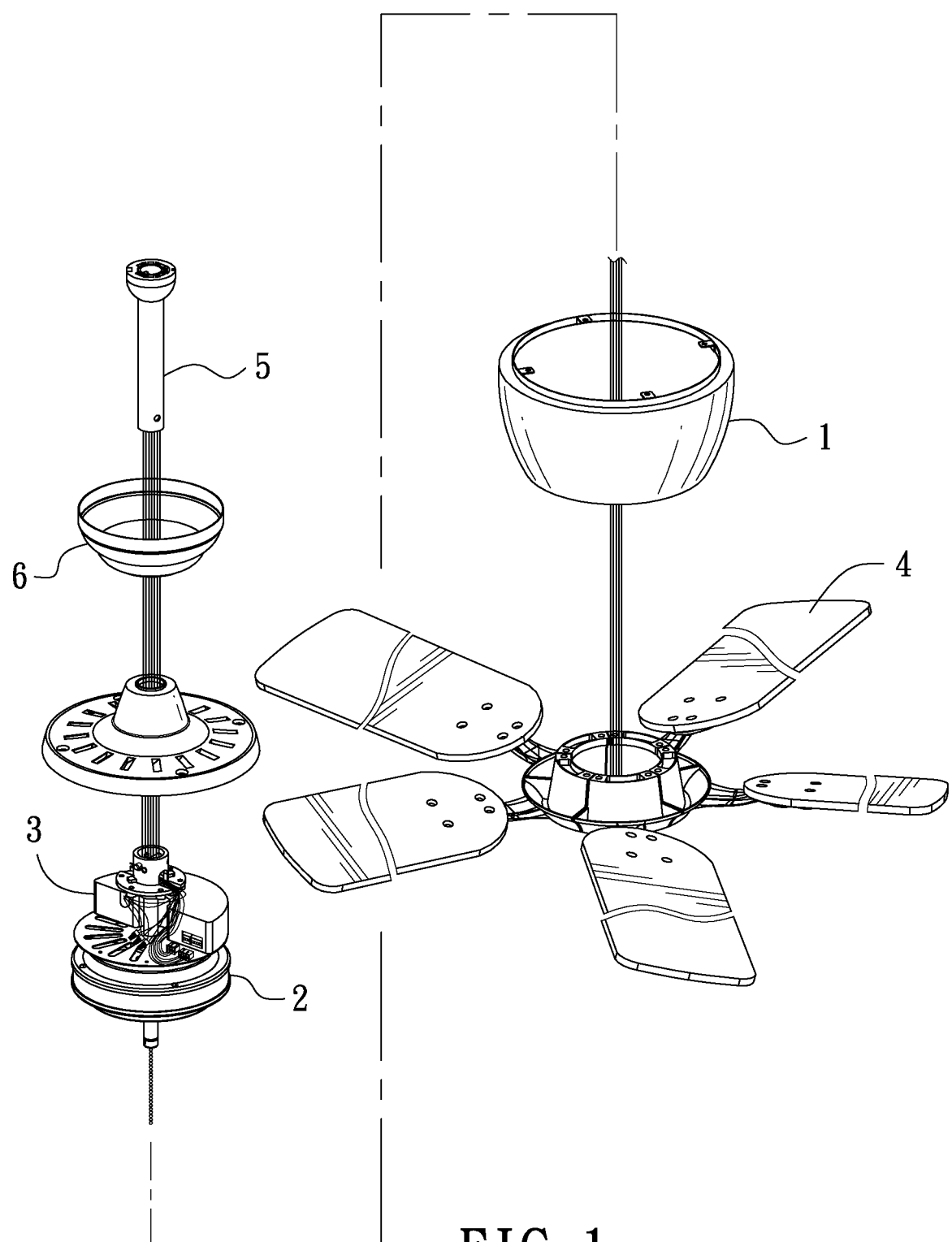
FIG. 1 is an exploded perspective view of a first conventional ceiling fan.
Figure 2:
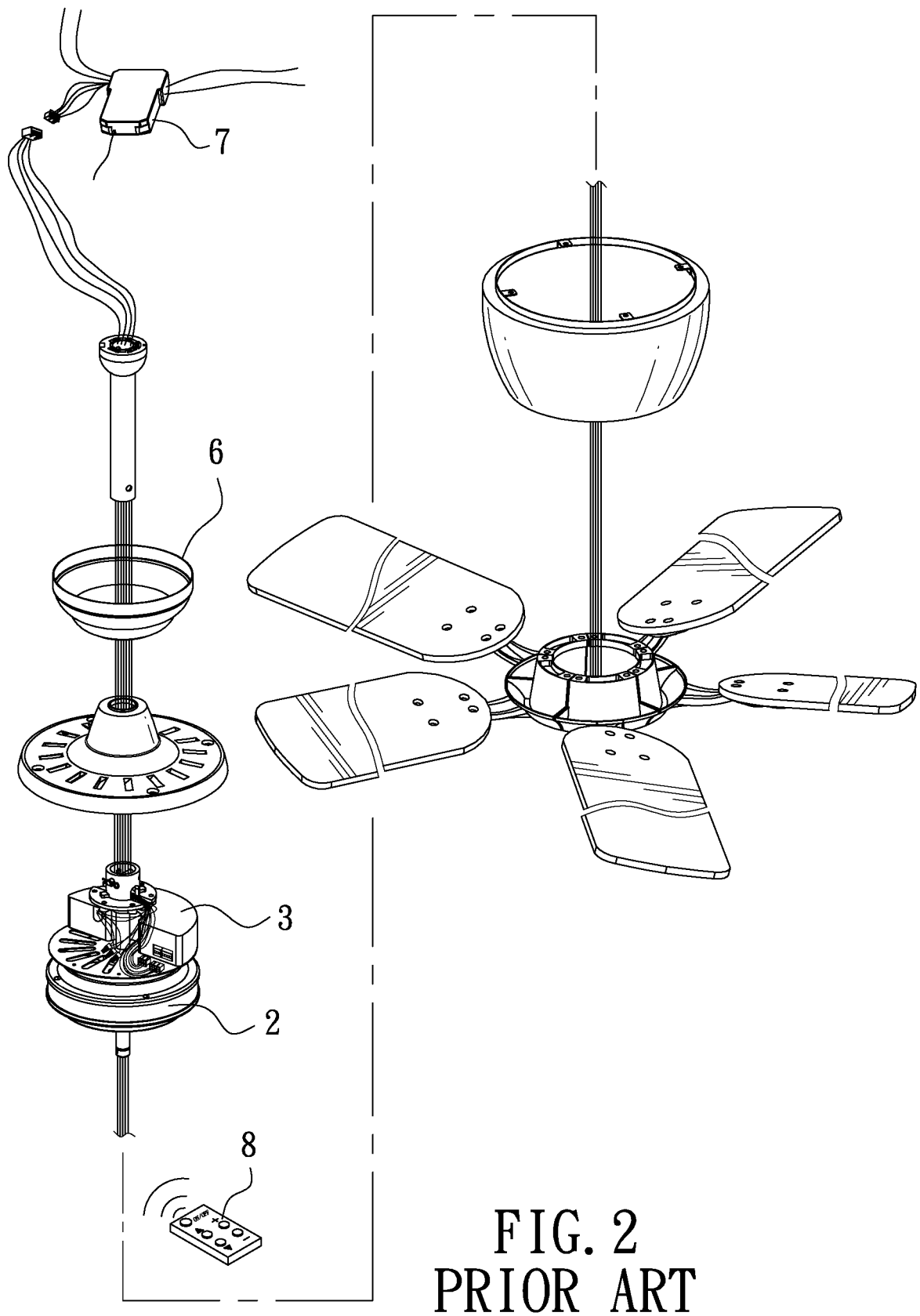
FIG. 2 is an exploded perspective view of a second conventional ceiling fan.
Figure 3:
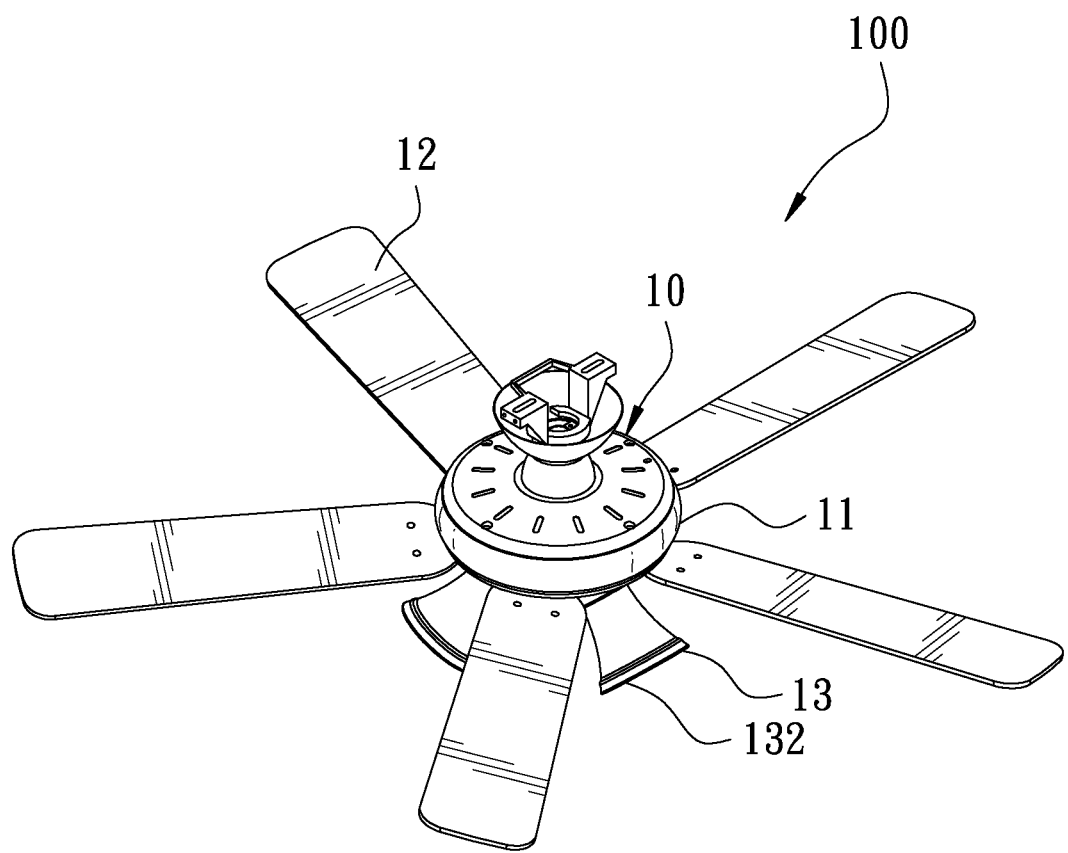
FIG. 3 is a perspective view of a first preferred embodiment of a ceiling fan with gesture induction function in the present invention.
Figure 4:
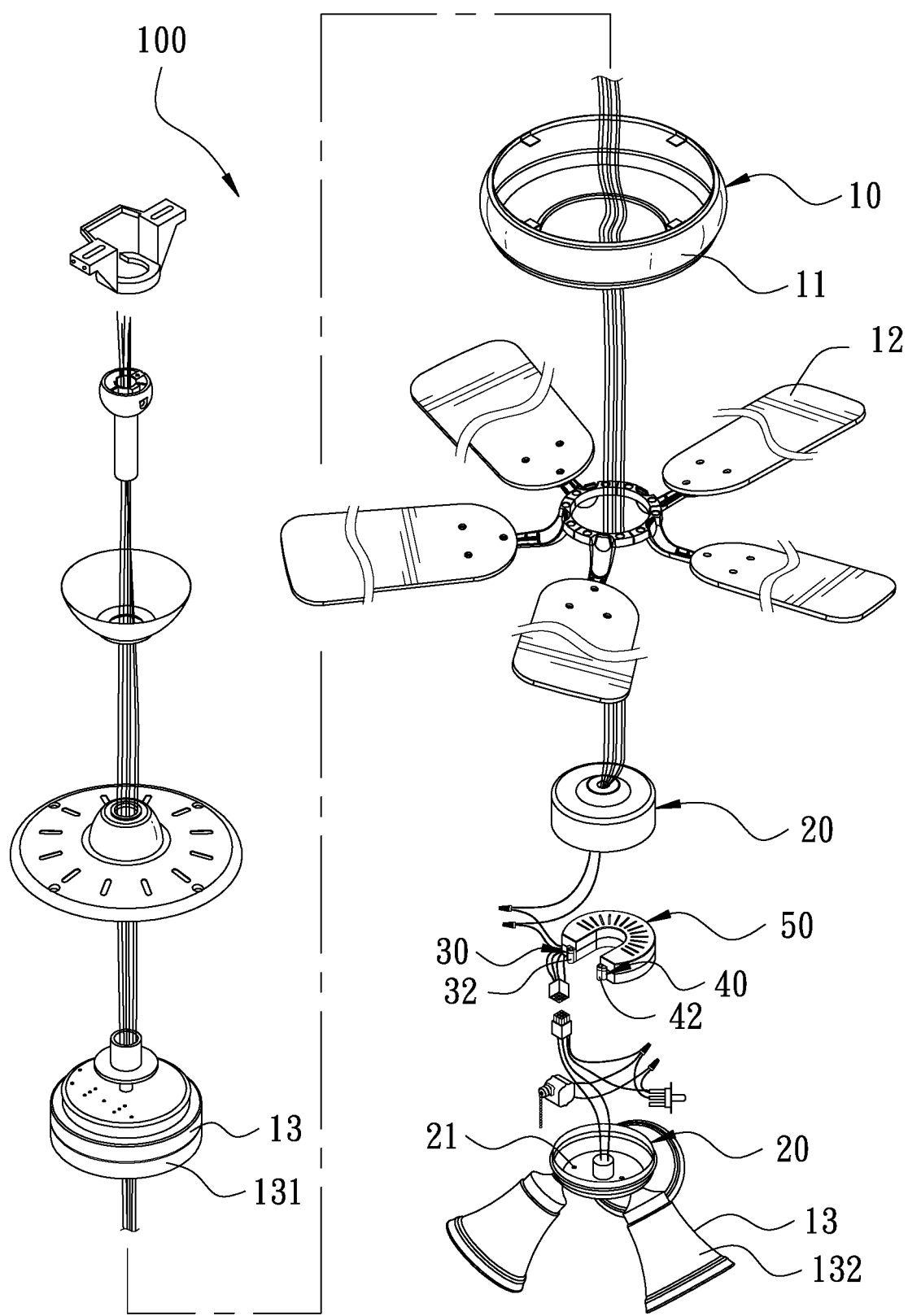
FIG. 4 is an exploded perspective view of the first preferred embodiment of the ceiling fan with gesture induction function in the present invention.
Figure 5:
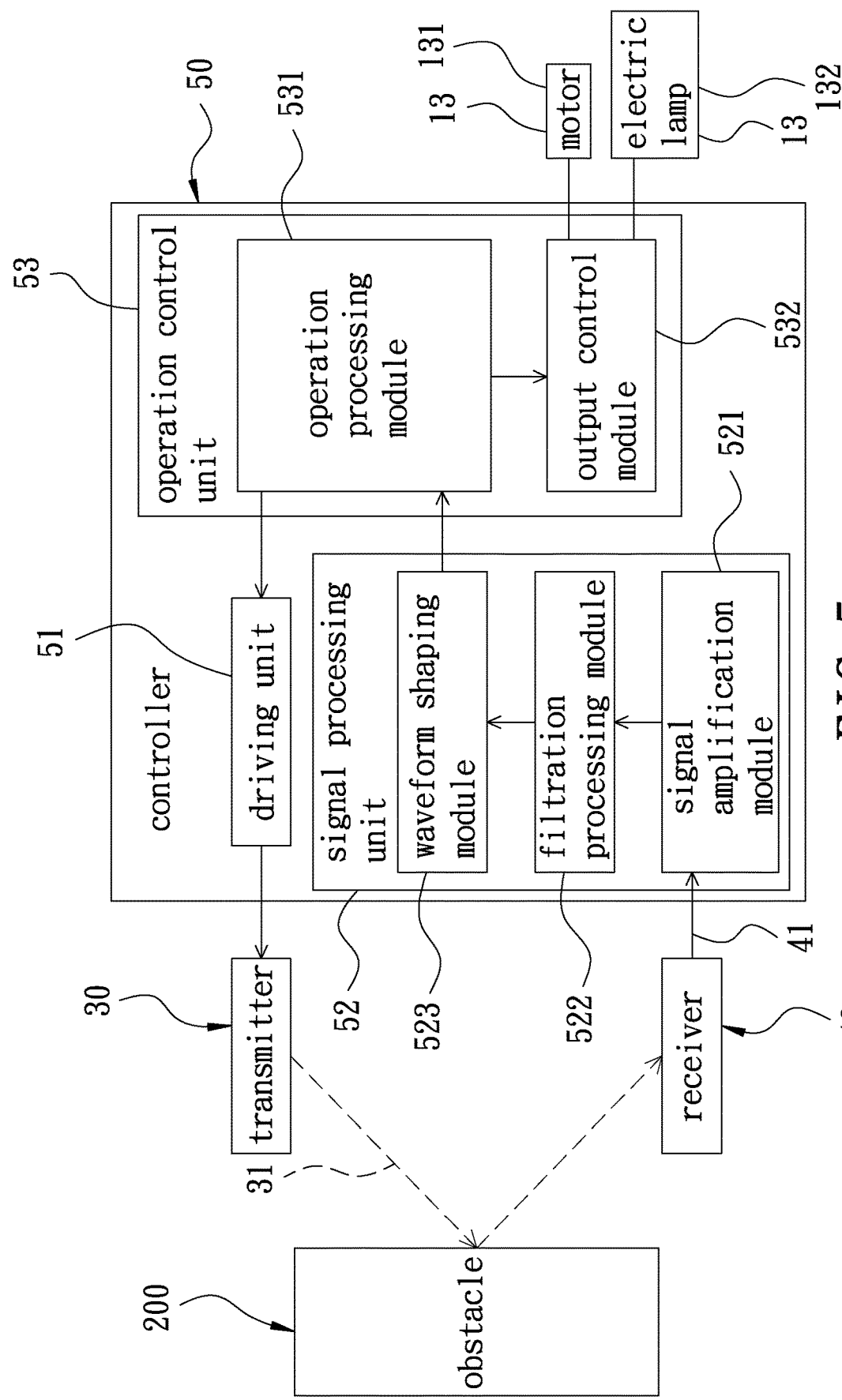
FIG. 5 is a block diagram of the first preferred embodiment of a structure of the ceiling fan with gesture induction function in the present invention, showing a state of a controller when a wireless signal is not obstructed by any barrier.

A first preferred embodiment of a ceiling fan 100 with gesture induction function in the present invention, as shown in FIG. 3-5, includes a main body 10, a switch box 20, a transmitter 30, a receiver 40 and a controller 50 as main components combined together.

The main body 10 is formed with a motor housing 11, a blade unit 12 and two electrical apparatuses 13, which can be a motor, a brushless motor or an electric lamp. In this preferred embodiment, the electrical apparatuses 13 are respectively a motor 131 and an electric lamp 132.

The switch box 20 is fixed at the underside of the motor housing 11 and located beneath the blade unit 12. In this preferred embodiment, the switch box 20 is firmly fixed with the motor housing 11 and bored with two insert holes 21.

The transmitter 30 is an infrared ray transmitter, able to transmit a reflexible wireless signal 31 and combined with the switch box 20. In this preferred embodiment, the transmitter 30 is received in the switch box 20 and provided with a transmitting part 32 corresponding to the insert hole 21 of the switch box 20, wherein the wireless signal 31 is infrared rays.

The receiver 40 is provided at the reflection path of the wireless signal 31, able to transmit a sampling signal 41 when the receiver 40 receives the wireless signal 31 and is unable to receive the wireless signal 31, and the receiver 40 is combined with the switch box 20. In this preferred embodiment, the receiver 40 is installed in the switch box 20 and provided with a receiving part 42 corresponding to the insert hole 21 of the switch box 20.

The controller 50 is electrically connected with the electrical apparatuses 13 and the transmitter 30 and the receiver 40. The controller 50 is mounted in the switch box 20 for driving the transmitter 30 and further controlling the electrical apparatuses 13 via reception of the sampling signal 41. The controller 50 contains a driving unit 51, a signal processing unit 52, and an operation control unit 53. The operation control unit 53 is electrically connected with the driving unit 51 and the signal processing unit 52 and the electrical apparatuses 13. The driving unit 51 is electrically connected with the transmitter 30 for driving the transmitter 30 to transmit the wireless signal 31. The signal processing unit 52 is electrically connected with the receiver 40 for receiving the sampling signal 41 of the receiver 40 and having the sampling signal 41 amplified, filtered and shaped and then, the signal processing unit 52 will transmit the sampling signal 41 to the operation control unit 53 for the operation control unit 53 to carry out calculation, memory, judgment and processing and further control the electrical apparatuses 13. The signal processing unit 52 contains a signal amplification module 521, a filtration processing module 522 and a waveform shaping module 523, while the operation control unit 53 contains an operation processing module 531 and an output control module 532. The operation processing module 531 is electrically connected with the driving unit 51 and the waveform shaping module 523 and the output control module 532. The filtering processing module 522 is electrically connected with the signal amplification module 521 and the waveform shaping module 523. The signal amplification module 521 is electrically connected with the receiver 40, and the output control module 532 is electrically connected with the motor 131 and the electric lamp 132 of the electrical apparatuses 13. The sampling signal 14 is transmitted to the operation processing module 531 orderly via the receiver 40, the signal amplification module 521, the filtering processing module 522 and the waveform shaping module 523.

In use, referring to FIGS. 4 and 5, when the ceiling fan 100 is connected with an electric power source and there is no barrier located at the reflection path of the wireless signal 31, the operation processing module 531 of the controller 50 will control the driving unit 51 to drive the transmitter 30 to transmit the wireless signal 131 to an obstacle 200 to make the wireless signal 31 reflected to the receiver 40. Simultaneously, the receiver 40 will transmit the sampling signal 41 orderly through the signal amplification module 521, the filtration processing module 522 and the waveform shaping module 523 of the signal processing unit 52 to have the sampling signal 41 amplified, filtered and shaped and afterward, the sampling signal 41 will be transmitted to the operation processing module 531 of the controller 50 to carry out calculation, memory, judgment and processing and further have the operation processing module 531 driving the output control module 532 to control the motor 131 and the electric lamp 132. In this preferred embodiment, when the receiver 40 can normally receive the wireless signal 31, the operation processing module 531 of the controller 50 will not execute action, letting the motor 131 and the electric lamp 132 maintain the state of the moment.

Figure 6:
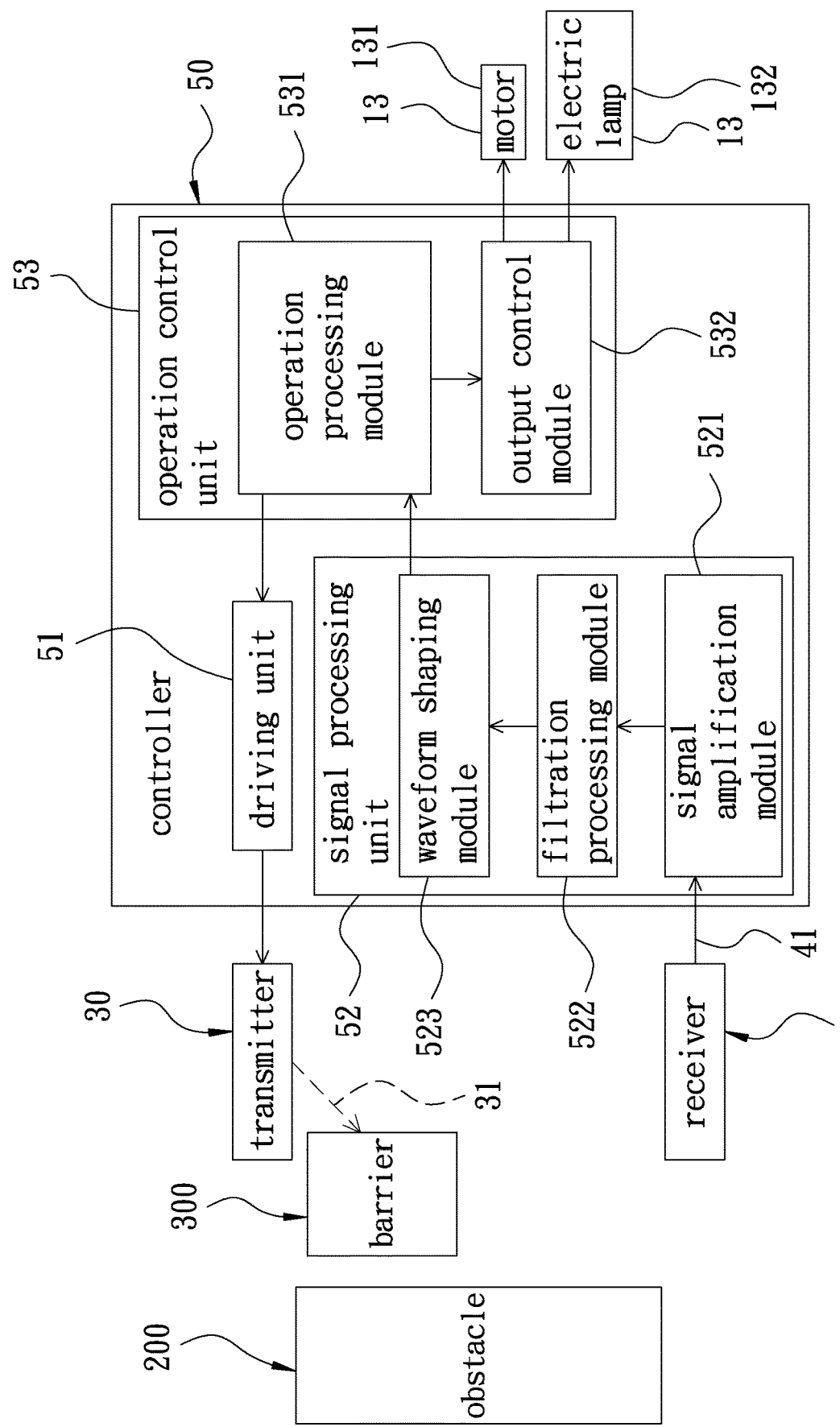
FIG. 6 is a block diagram of the first preferred embodiment of the structure of the ceiling fan with gesture induction function in the present invention, showing the state of the controller when the wireless signal is obstructed by a barrier.

Referring to FIG. 6, when there is a barrier 300, which can be any object or a part of human body like hands and feet, is located at the reflection path of the wireless signal 31 to obstruct transmission of the wireless signal 31 and in this case, the wireless signal 31 will decay or become abnormal to make the receiver 40 unable to receive the wireless signal 31 or only able to receive weak wireless signals. Simultaneously, the receiver 40 will transmit the sampling signal 41 to the signal processing unit 52 and the operation processing module 531 of the operation control unit 53 to carry out calculation, memory, judgment and processing and further actuate the operation processing module 531 to drive the output control module 532 to control the motor 131 and the electric lamp 132. In this preferred embodiment, when the receiver 40 cannot normally receive the wireless signal 31, for instance, when the wireless signal 31 decays or is obstructed, the operation processing module 531 of the controller 50 will carry out calculation, memory, judgment and processing and drive the output control module 532 to control the motor 131 and the electric lamp 132 to change their current states. For instance, the rotating speed of the motor 131 and the brightness of the electric lamp 132 can be switched, or the motor 131 and the electric lamp 132 can be alternated with each other in accordance with frequency, time, and area that the barrier 300 obstructs the wireless signal 31, or the signal strength changes of the wireless signal 31. Thus, a user need not employ a remote controller or a manual switch to control the motor 131 and electric lamp 132 of the ceiling fan 100, comparatively convenient in use.

Figure 7:
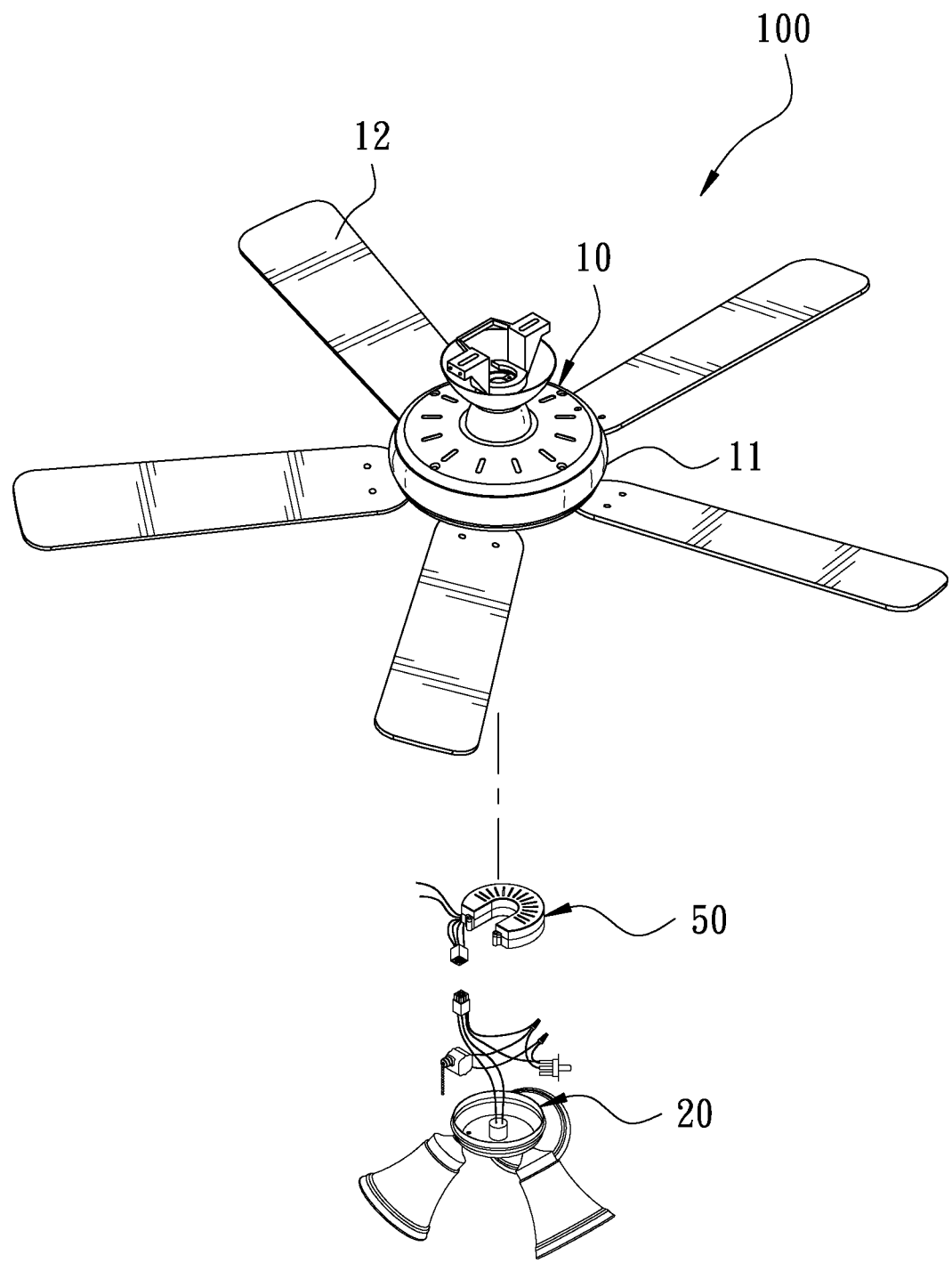
FIG. 7 is a schematic view of the first preferred embodiment of the ceiling fan with gesture induction function in use in the present invention, showing the state when a switch box is repaired.

Referring to FIG. 7, when the controller 50, the transmitter 30 or the receiver 40 needs to be repaired, since the switch box 20 is combined with the motor housing 11 and secured at the underside of the motor housing 11 and located beneath the blade unit 12, and the controller 50, the transmitter 30 and the receiver 40 are all received in the switch box 20; therefore, a repairman only needs to open the motor housing 11 and the switch box 20 beneath the blade unit 12 to carry out repair work, needless to disassemble the motor housing 11. Thus, when working at the high place, the repairman can keep away from the fan blades so the ceiling fan 100 with ameliorated structure of this invention is safer and more convenient in maintenance.

Figure 8:
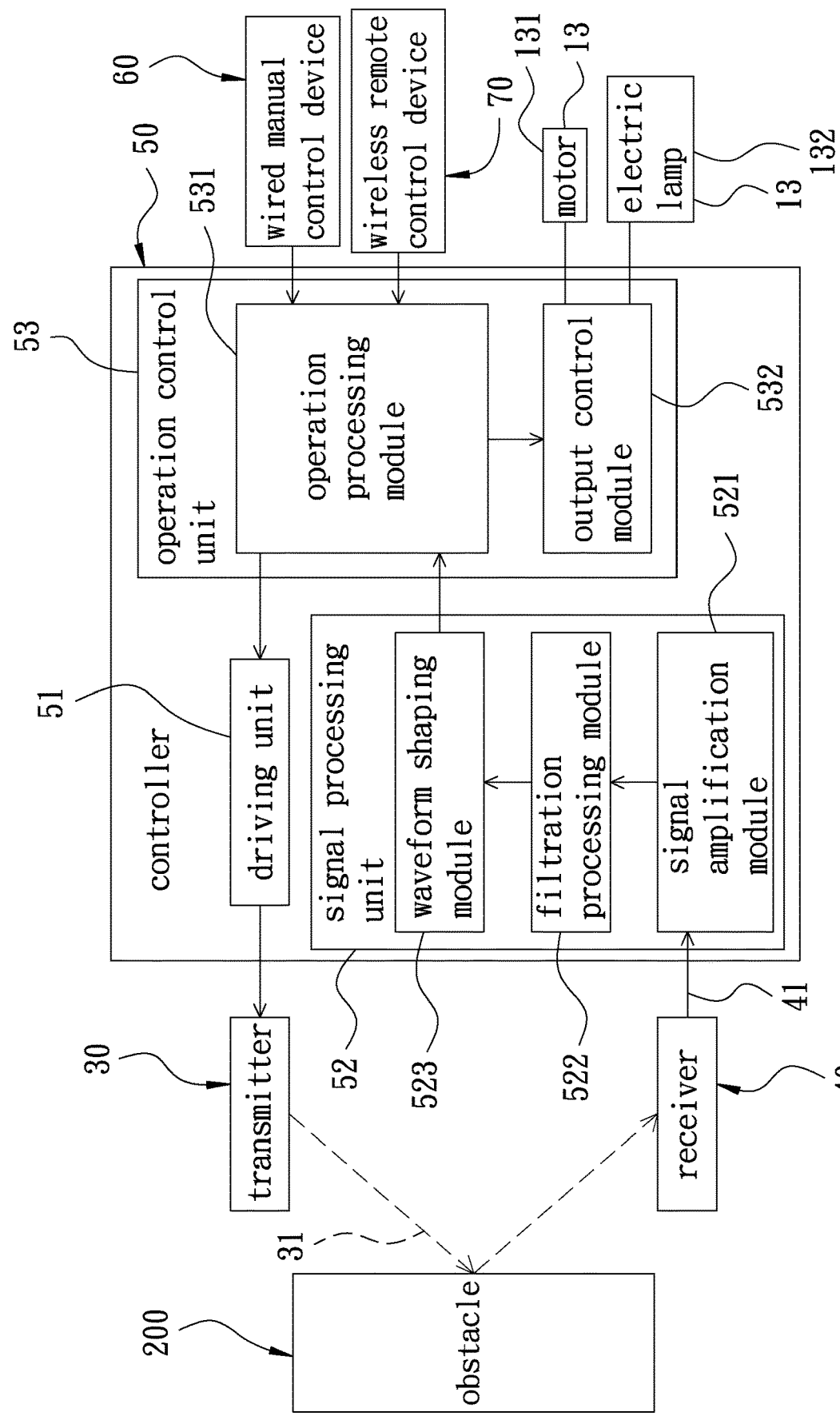
FIG. 8 is a block diagram of a second preferred embodiment of a structure of the ceiling fan with gesture induction function in the present invention.

A second preferred embodiment of a ceiling fan with gesture induction function in the present invention, as shown in FIG. 8, has almost the same structure as that of the first preferred embodiment, except that the operation processing module 531 of the operation control unit 53 is further electrically connected with at least one wired manual control device 60 and one wireless remote control device 70. The wired manual control device 60 can be a wired manual switch or a toggle switch. By employing the wired manual control device 60 and the wireless remote control device 70, a user can compulsorily carry out switching of the segments and the states of the motor 131 and the electric lamp 132, or switching between the motor 131 and the electric lamp 132, thus enabling a user to control the ceiling fan 100 in multiple ways.

While the preferred embodiments of the invention have been described above, it will be recognized and understood that various modifications may be made therein and the appended claims are intended to cover all such modifications that may fall within the spirit and scope of this invention.

What is claimed is:

1. A ceiling fan with gesture induction function comprising:
   a main body formed with a motor housing, a blade unit and at least one electrical apparatus;
   a transmitter able to transmit a reflexible wireless signal;
   a receiver provided at a reflection path of said wireless signal, said receiver able to transmit a sampling signal when said receiver receives said wireless signal and is unable to receive said wireless signal;
   a controller electrically connected with said at least one electrical apparatus and said transmitter and said receiver, said controller driving said transmitter, said controller able to control said at least one electrical apparatus through reception of said sampling signal;
   said controller comprises a driving unit, a signal processing unit and an operation control unit, said operation control unit electrically connected with said driving unit and said signal processing unit and said at least one electrical apparatus, said driving unit electrically connected with said transmitter for driving said transmitter to transmit said wireless signal, said signal processing unit electrically connected with said receiver for receiving said sampling signal of said receiver, said signal processing unit having said sampling signal amplified, filtered and shaped and then transmitting said sampling signal to said operation control unit for carrying out calculation, memory, judgment and processing and further controlling said at least one electrical apparatus; and
   said signal processing unit comprises a signal amplification module, a filtration processing module and a waveform shaping module, said operating control unit comprising an operation processing module and an output control module.

2. The ceiling fan with gesture induction function as claimed in claim 1, wherein a switch box is secured at an underside of said motor housing and located beneath said blade unit.

3. The ceiling fan with gesture induction function as claimed in claim 2, wherein said controller is received in said switch box.

4. The ceiling fan with gesture induction function as claimed in claim 2, wherein said transmitter is combined with said switch box and said receiver is assembled with said switch box.

5. The ceiling fan with gesture induction function as claimed in claim 4, wherein said transmitter is received in said switch box and said receiver is provided in said switch box.

6. The ceiling fan with gesture induction function as claimed in claim 5, wherein said switch box is bored with at least one insert hole, said transmitter provided with a transmitting part corresponding to the insert hole of said switch box, said receiver provided with a receiving part corresponding to the insert hole of said switch box.

7. The ceiling fan with gesture induction function as claimed in claim 1, wherein said operation processing module is electrically connected with said driving unit and said waveform shaping module and said output control module, said filtration processing module electrically connected with said signal amplification module and said waveform shaping module, said signal amplification module electrically connected with said receiver, said output control module electrically connected with said at least one electrical apparatus, said sampling signal transmitted to said operation processing module orderly via said receiver and said signal amplification module and said filtration processing module and said waveform shaping module.

8. The ceiling fan with gesture induction function as claimed in claim 1, wherein said operation control unit is electrically connected with at least one wired manual control device, and said wired manual control device can be a wired manual switch or a toggle switch.

9. The ceiling fan with gesture induction function as claimed in claim 1, wherein said operation control unit is further electrically connected with a wireless remote control device.

10. The ceiling fan with gesture induction function as claimed in claim 1, wherein said at least one electrical apparatus can be a motor, a brushless motor or an electric lamp.

11. The ceiling fan with gesture induction function as claimed in claim 1, wherein said transmitter is an infrared ray transmitter, said wireless signal being infrared rays.

* * * * *